Nov. 10, 1942.  E. J. HECHLER  2,301,539
METHOD OF SHARPENING SAWS
Original Filed Dec. 17, 1940
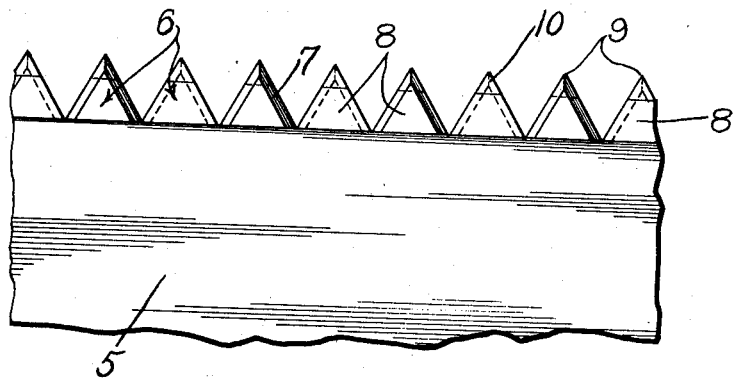
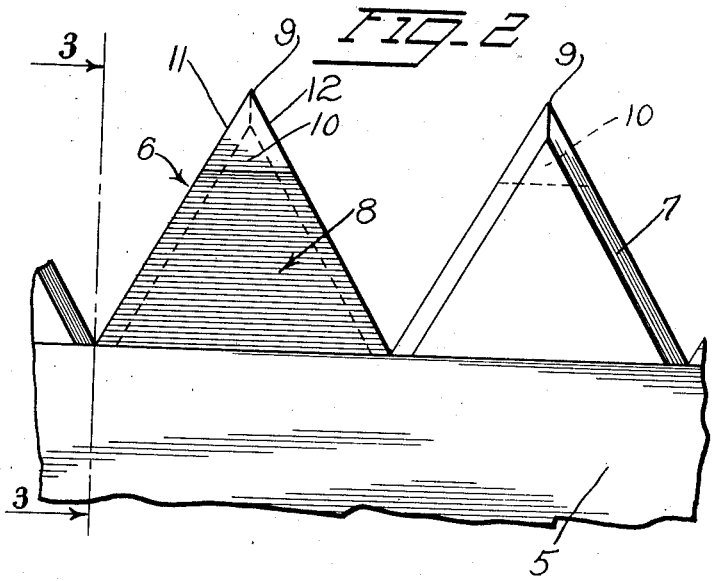
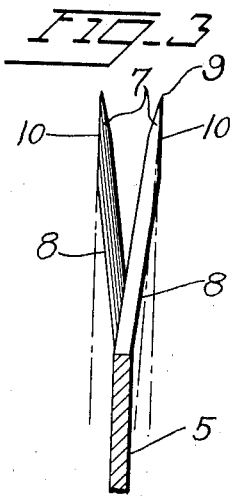
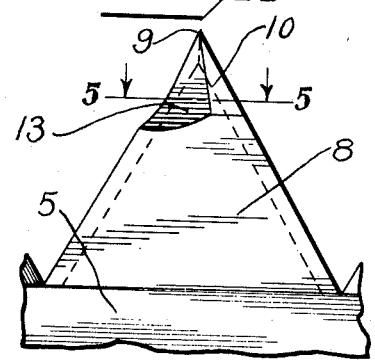
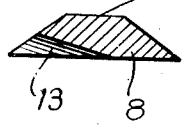
Inventor
Ernest J. Hechler.
By Lacy & Lacy,
Attorneys Patented Nov. 10, 1942

2,301,539

UNITED STATES PATENT OFFICE 2,301,539

METHOD OF SHARPENING SAWS

Ernest J. Hechler, Troy, Mo.

Original application November 8, 1938, Serial No. 239,582, now Patent No. 2,224,867, dated December 17, 1940. Divided and this application September 30, 1940, Serial No. 359,118

2 Claims. (Cl. 76—46)

This invention relates to saws of that general type shown and described in my copending application filed in the United States Patent Office on the 8th day of November, 1938, under Serial No. 239,582, and on which Letters Patent No. 2,224,867, issued Dec. 17, 1940, the present invention being a division thereof.

The object of the invention is to provide a novel method or process of filing the teeth of the saw after said teeth have been sharpened and set whereby the saw will cut through boards, logs and other lumber with minimum effort on the part of the operator and produce a smooth glass-like surface at the cut end of the lumber so as to render it unnecessary to subsequently plane or otherwise finish said cut end in order to match the end of an adjacent strip of lumber.

The method consists in sharpening and setting the teeth of the saw, placing the saw on a flat surface with one side of the saw in contact therewith, positioning an abrasive tool against the sides of the set teeth near the points thereof and moving said tool longitudinally of the saw to form alternate teeth on one side of the saw with beveled faces, reversing the position of the saw on said flat surface and moving the abrasive tool longitudinally thereof and in contact with the set teeth to bevel alternate teeth on the other side of said saw, and subsequently chamfering the beveled faces of some or all of the teeth to form a relieved area extending transversely of the teeth for a portion of the width thereof.

In the accompanying drawing forming a part of this specification and in which similar numerals of reference indicate corresponding parts in all the figures of the drawing:

Figure 1 is a side elevation of a portion of a saw blade constructed in accordance with my improved method, the chamfered portions of the teeth being omitted for the sake of clearness, Figure 2 is a similar view on an enlarged scale showing the construction of the teeth of the saw before being chamfered, Figure 3 is a vertical sectional view taken on the line 3—3 of Figure 2.

Figure 4 is a side elevation of one of the saw teeth after the beveled edge thereof has been chamfered, and Figure 5 is a transverse sectional view taken on the line 5—5 of Figure 4.

The improved method or process forming the subject-matter of the present invention may be used in connection with cross cut saws, rip saws, circular saws or any other type of saw, and in Figure 1 of the drawing, there is illustrated a cross cut saw, in which 5 designates the blade, the teeth 6 of which are sharpened at 7 and set in the usual manner.

In carrying the invention into effect, I file or otherwise cut the smooth face 8 of each tooth longitudinally thereof in the direction of the point 9 of the tooth to provide a beveled surface 10 disposed at an angle to the set of the tooth and defining oppositely disposed cutting edges 11 and 12. These cutting edges 11 and 12 operate on the lumber with a planing action when the saw is in use and produce a smooth glass-like surface devoid of ridges, saw tooth markings and other irregularities. The beveled surface 10 preferably extends for approximately one-third of the length of the tooth, but it will, of course, be understood that the length of the beveled surface is optional and may be varied according to the conditions under which the saw is to be used. By reference to Figure 1 of the drawing, it will be noted that, while the pointed end of each tooth is provided with a beveled surface 10, said beveled surfaces are alternately disposed when the saw is viewed in side elevation so that the edges thereof cut through the lumber on both the up and down stroke of said saw. It will further be noted by reference to Figure 3 that the beveled portion 10 is disposed substantially parallel to the vertical plane of the body of the blade 5, but the inclination of the bevel may be varied if desired so that said bevel will be disposed at an angle to the saw blade as well as to the set of the saw tooth, as indicated in dotted lines in said figure.

One side of the beveled face 10 of each or all of the saw teeth is curved or chamfered, at 13, thereby forming a relieved area extending transversely of the tooth for a portion of the width thereof and some distance back of its leading edge to assist in preventing wedging or sticking of the blade in the saw kerf during the sawing operation. This chamfering of the beveled faces of the teeth is particularly applicable to rip saws or other saws having a one-way cut. It will therefore, be understood that in certain types of saws the chamfered portions may be omitted if desired without departing from the spirit of the invention.

In treating a standard saw in accordance with my improved method or process, the teeth of the saw are first sharpened and set in the usual manner. The saw is then supported on a table or other flat surface with the blade 5 in contact therewith, and by means of a file, emery wheel or other suitable tool the beveled portions 10 are formed on the teeth on one side of the saw by pressing the file or emery wheel flat against the teeth and moving said file longitudinally thereof. After the teeth on one side of the saw have been sharpened, the saw is reversed and the same operation repeated on the teeth on the other side of the saw so that the outer surfaces of alternate set teeth on both sides of the saw will be provided with said beveled faces. The beveled faces of some or all of the saw teeth are then chamfered in the manner previously described, thus forming a relieved portion extending transversely of the beveled face of the tooth so as to assist in preventing wedging or sticking of the blade in the saw kerf during the sawing operation, as previously stated.

A saw constructed in accordance with my improved method or process does not materially increase the cost of manufacture thereof while at the same time provides a saw which is easy to operate and which will produce a smooth cut in the lumber so as to render it unnecessary to subsequently plane or otherwise finish the cut end or ends in order to match the end of an adjacent strip of lumber.

It will, of course, be understood that the improved method may be used in connection with any type of saw and that the chamfered portions of the teeth may be formed either before or after said teeth are inclined or beveled.

Having thus described the invention, what is claimed as new is:

1. The method of sharpening straight saws having triangular shaped teeth provided with beveled cutting edges and having the medial line of each tooth extending substantially at right angles to the saw blade, said method comprising sharpening and setting the teeth of the saw, placing the saw on a flat surface with one side of the saw in contact therewith, positioning an abrasive tool against the sides of the set teeth near the points thereof and moving said tool longitudinally of the saw to form alternate teeth on one side of the saw with beveled faces inclined in the direction of the saw tooth points and intersecting said points and the beveled cutting edges of the teeth, reversing the position of the saw on said flat surface and moving the abrasive tool longitudinally thereof and in contact with the set teeth to bevel alternate teeth on the other side of said saw in a like manner.

2. The method of sharpening straight saws having triangular shaped teeth provided with beveled cutting edges and having the medial line of each tooth extending substantially at right angles to the saw blade, said method comprising sharpening and settnig the teeth of the saw, placing the saw on a flat surface with one side of the saw in contact therewith, positioning an abrading tool against the sides of the set teeth near the points thereof and moving said tool longitudinally of the saw to form alternate teeth on one side of the saw with beveled faces inclined in the direction of the saw tooth points and intersecting said points and the beveled cutting edges of the teeth, reversing the position of the saw on said flat surface and moving the tool longitudinally thereof and in contact with the set teeth to bevel alternate teeth on the other side of said saw in a like manner, and subsequently chamfering one side of some or all of the teeth of the saw at the beveled faces thereof to provide relieved areas extending downwardly from the points of the teeth and inwardly transversely thereof for a portion of their width and some distance back of the leading edges of said teeth.

ERNEST J. HECHLER.